United States Patent [19]

Fattor

[11] 4,223,664
[45] Sep. 23, 1980

[54] CONCENTRATING SOLAR HEAT COLLECTOR

[75] Inventor: Arthur P. Fattor, Englewood, Colo.
[73] Assignee: Sun-Heet, Inc., Englewood, Colo.
[21] Appl. No.: 34,382
[22] Filed: Apr. 30, 1979

Related U.S. Application Data

[62] Division of Ser. No. 824,569, Aug. 15, 1977, Pat. No. 4,173,214.

[51] Int. Cl.³ .............................................. F24J 3/02
[52] U.S. Cl. ..................................... 126/438; 126/430; 126/436; 126/446
[58] Field of Search ............... 126/438, 419, 422, 430, 126/436, 418, 450, 439, 451, 446

[56] References Cited

U.S. PATENT DOCUMENTS

| | | | |
|---|---|---|---|
| 2,595,905 | 5/1952 | Telkes | 126/419 |
| 3,915,147 | 10/1975 | Rineer | 126/438 |
| 3,973,552 | 8/1976 | Ervin, Jr. | 126/438 X |
| 4,026,269 | 5/1977 | Stelzer | 126/438 X |

Primary Examiner—James C. Yeung
Assistant Examiner—Larry Jones
Attorney, Agent, or Firm—Richard D. Law

[57] ABSTRACT

A heat storage unit is integrated with a collection unit providing a heat supply in off-sun times, and includes movable insulation means arranged to provide insulation during off-sun times for the heat storage unit.

2 Claims, 8 Drawing Figures

U.S. Patent  Sep. 23, 1980  Sheet 1 of 3  4,223,664
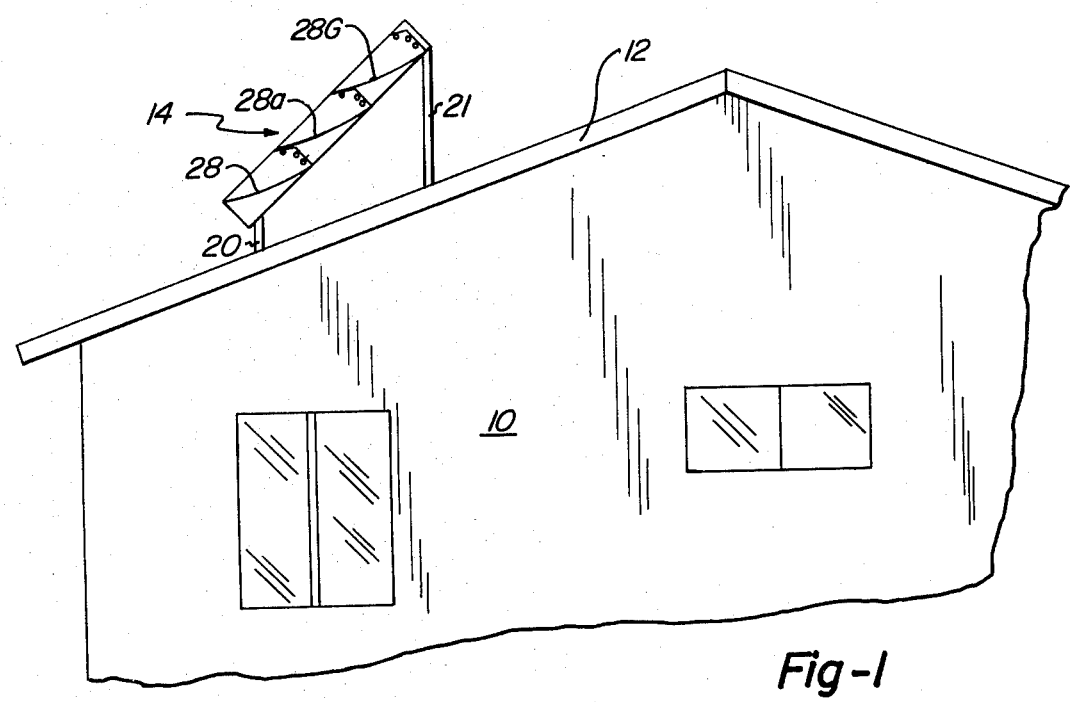
Fig-1
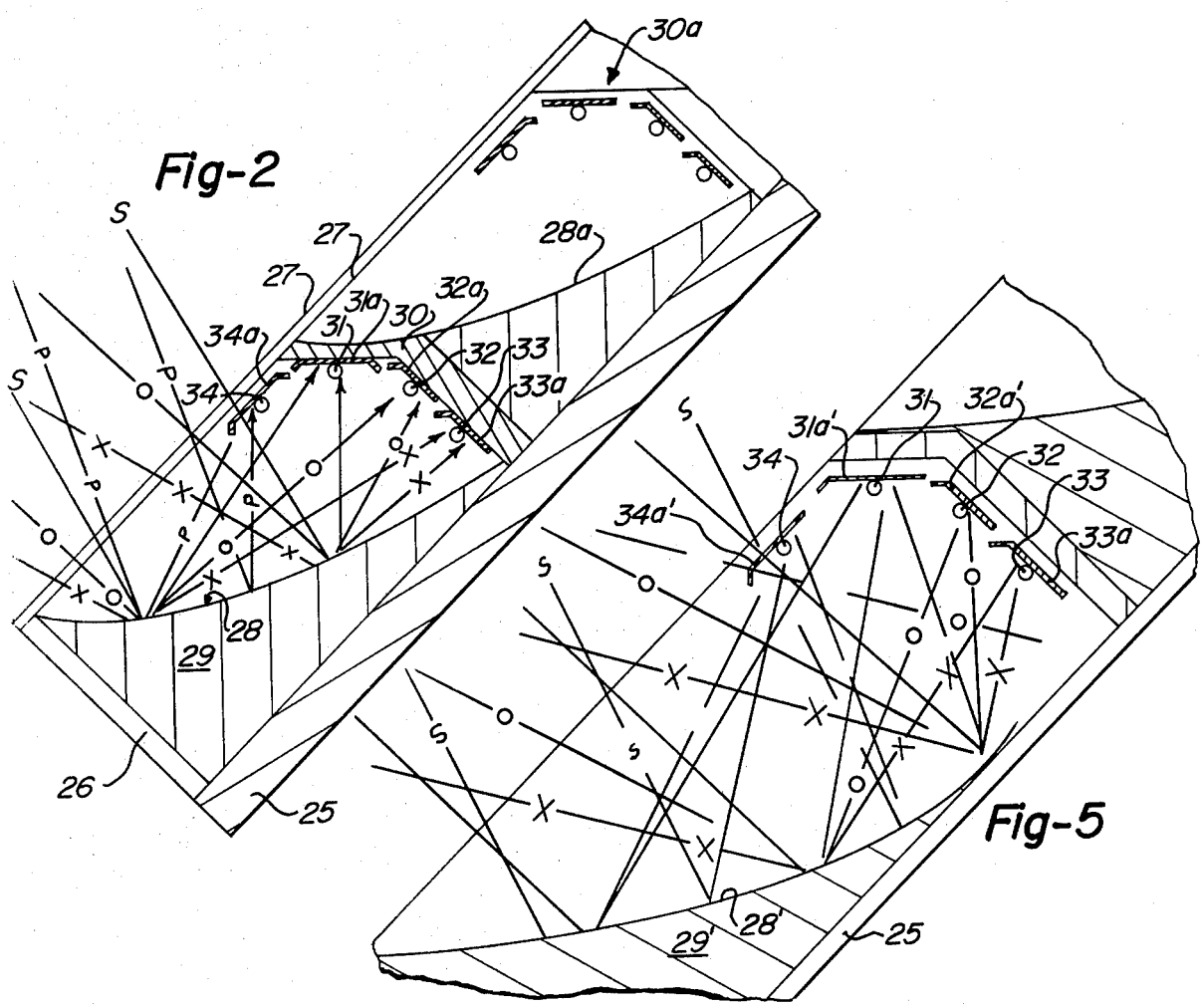
Fig-2
Fig-5

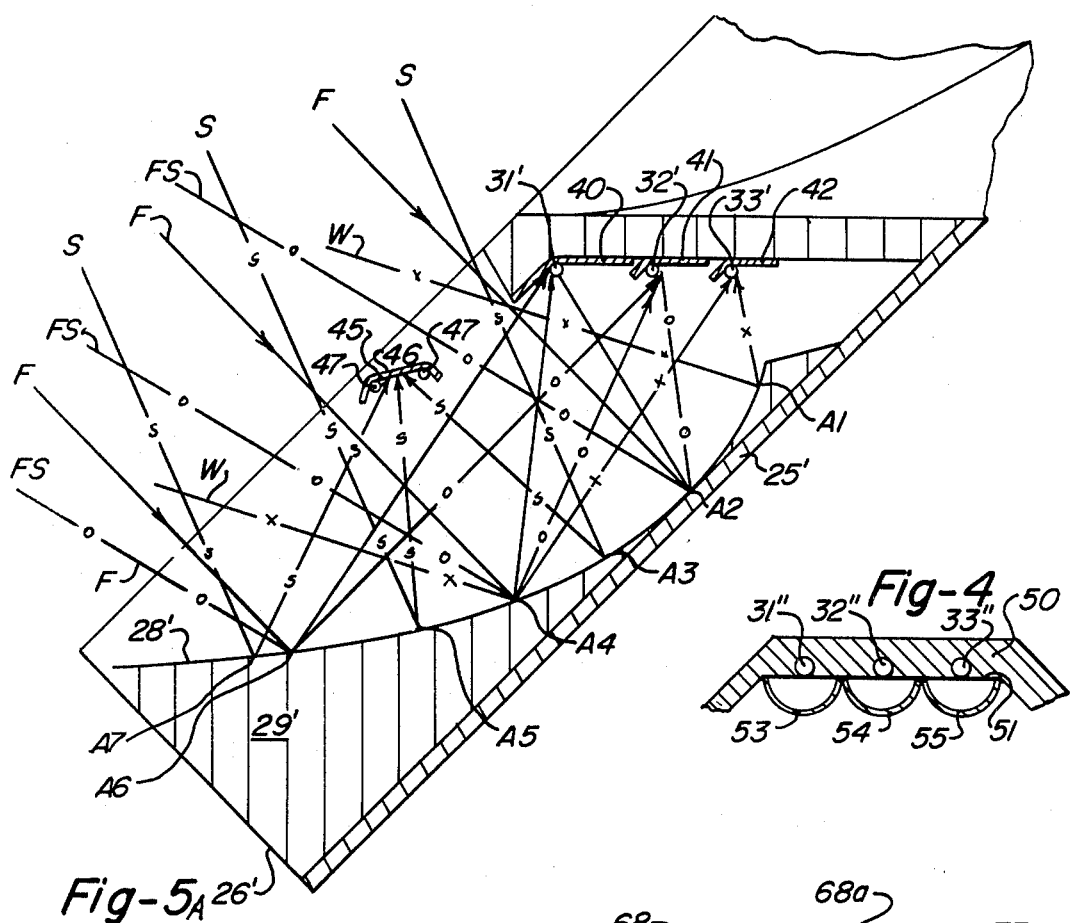
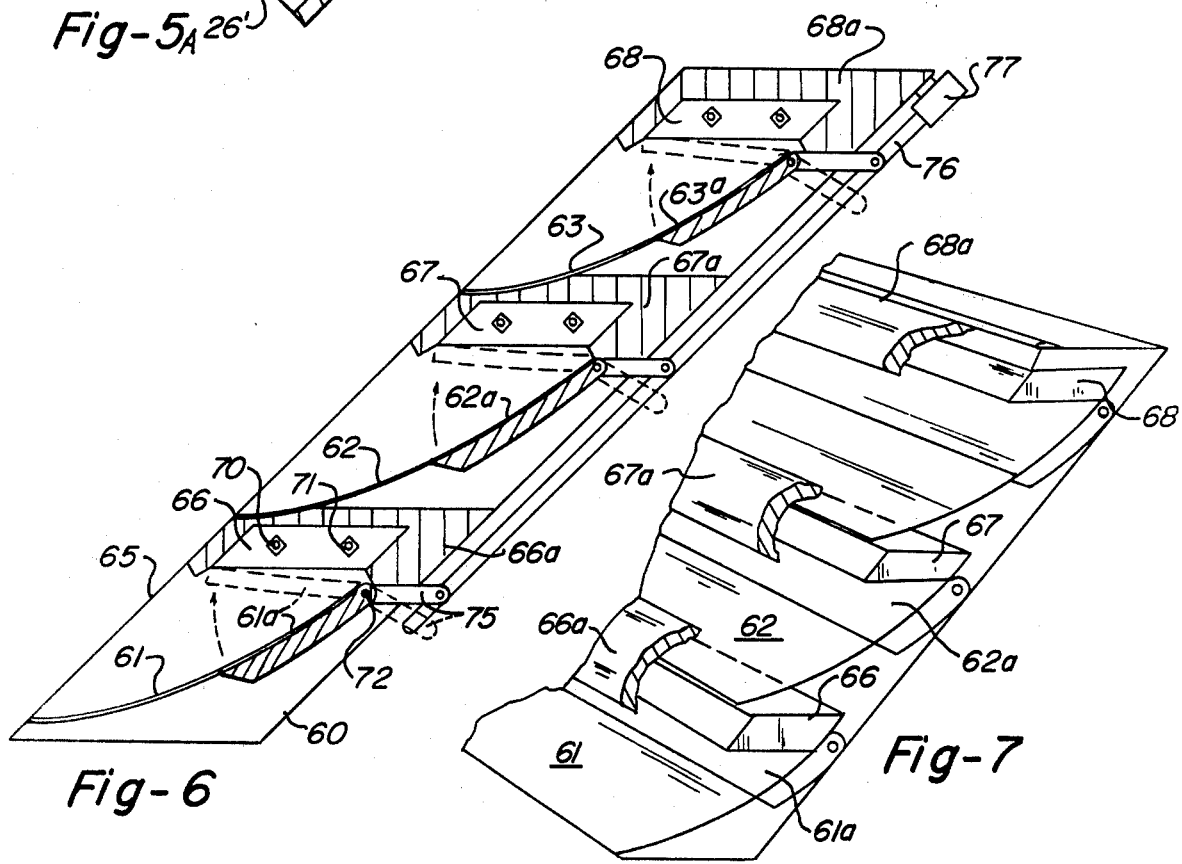

CONCENTRATING SOLAR HEAT COLLECTOR

This is a division of application Ser. No. 824,569, filed Aug. 15, 1977, now U.S. Pat. No. 4,173,214.

PRIOR ART

The use of insolation for various types of heating has its roots in pre-history of man. Recent developments in the use of solar radiation have extended the collected heat use beyond times of daylight insolation, by using heat sinks or storage units. Heat from the sun is collected and stored in the units, and it is then distributed to the point of use by heat transfer means such as liquids, gases, and the like.

Of the many devices which have been proposed to utilize solar radiation, each has specific features which are generally useful for specific purposes as desired by the maker. In some types of apparatus, the direct rays of sun are absorbed for heating, for example, U.S. Pat. No. 3,001,331, which shows a roof covering having heat absorption areas and heat reflection areas which may be changed in their annular relation, to either heat the attic area or reflect the sun's rays from the roof. Other devices utilize reflected rays from various types of surfaces, for example, U.S. Pat. No. 2,625,930, in which a plurality of shallow reflecting surfaces permits the reflection of the winter sun into each of the spaces beneath spaced grooves, and the unit reflects summer sun rays away from the building. In a modified form of reflector type device, U.S. Pat. No. 3,321,012, a plurality of semi-circular reflector tube so both reflected and direct rays are collected from the sun. A focusing type of device is shown in U.S. Pat. No. 1,933,213, for heating water, and the focusing unit requires sun tracking for focusing of sun's rays accurately on the bottom of the water vessel, and, this, of course, requires accurate movement of the reflector in relation to the sun. An early concept of the solar furnaces shown in U.S. Pat. No. 811,274, where large area reflector surfaces are focused on a small target, further illustrating the requirement of the tracking mechanism, permitting the exact positioning of the reflector surface in relation to the direction of solar radiation. U.S. Pat. No. 3,179,105, illustrates a parabolic solar reflector mounted on the roof of a structure, and arranged to reflect a large area of insolation, and focus winter sun radiation into a small target for producing a heated transfer medium and for reflecting summer solar radiation to prevent heating of the unit.

In my U.S. Pat. No. 4,015,585, issued Apr. 5, 1977, I have described a single large trough parabolic reflector for concentrating the sun's radiation at various times of the year into a line reflection onto an upright or overhanging target, with the line focus moving transversely across the targets as the sun's angle changes with various seasons of the year.

THE PRESENT INVENTION

According to the present invention, I have provided an improvement of my above described U.S. Pat. No. 4,015,585, wherein a plurality of small reflectors of the trough-parabolic type provide a series of concentrated line reflections of solar radiation into generally vertical reflected lines. A heat absorber system is provided for each of the series of reflectors, and each is arranged to provide a series of stationary targets for the reflected lines from each of the reflectors. The reflectors are arranged to reflect solar radiation onto a specific target of a series of targets at various seasons of the year. The targets are oriented in an orderly, variously angled pattern and are positioned to capture the reflected radiation impinging on the reflecting parabolic surfaces below. In one form, three separate heat absorbine target units are arranged in each target system, for individually accepting the concentrated solar radiation at that time of year when the solar radiation impinges upon that particular absorber, while the other two heat absorber systems are inoperative. In another form, a heat sink is incorporated with the absorbers to accept heat from radiation at any reflection angle, and to store the absorbed heat. The absorbed heat is for use in heating a transfer medium, and the unit is provided with means for insulating the heat sink in off-sun times.

OBJECTS AND ADVANTAGES

Included among the objects and advantages of the present invention is to provide a series of trough-parabolic reflectors each having a series of superposed heat absorbers arranged to intercept focused rays individually at various sun angles.

Another object of the invention is to provide a series of trough-parabolic reflectors, each with an upright and overhanging heat absorber system, and each arranged with a series of individual heat absorbing circuits controlled to individually operate at a particular season when the solar radiation is reflected onto that particular individual circuit while the remaining circuits are held inoperative.

A further object of the invention is to provide a series of trough-parabolic reflectors, each providing a concentrated line reflection of substantially hotter than non-concentrated solar radiation, and each of the series of reflectors are provided with its own heat absorption system.

A still further object of the invention is to provide a series of solar radiation heat collection systems, each system incorporating a heat storage unit having means for insulating the heat storage unit during off-sun times.

An additional object of the invention is to provide a solar radiation heat collection means including a vacuum chambered element for heat absorption with substantially reduced reradiation of heat.

These and other objects and advantages of the invention may be readily ascertained by referring to the following description and appended illustrations in which:

GENERAL DESCRIPTION OF THE DRAWINGS

FIG. 1 is a side elevational view of a building incorporating one form of a solar heat collecting structure, according to the invention mounted in a stationary position on the roof of the structure.

FIG. 2 is an enlarged detail, side elevational view of one form of the invention illustrating various angles of solar radiation due to sun positions at different seasons of the year.

FIG. 4 is a cross-sectional side elevational detail view of one form of solar radiation heat absorber circuit providing a modified collection unit.

FIG. 5 is a schematic side elevational detail view of one form of an individual trough-parabolic reflector surface, showing multiple targets for reflection of solar radiation at different times of the year.

Figure 3:
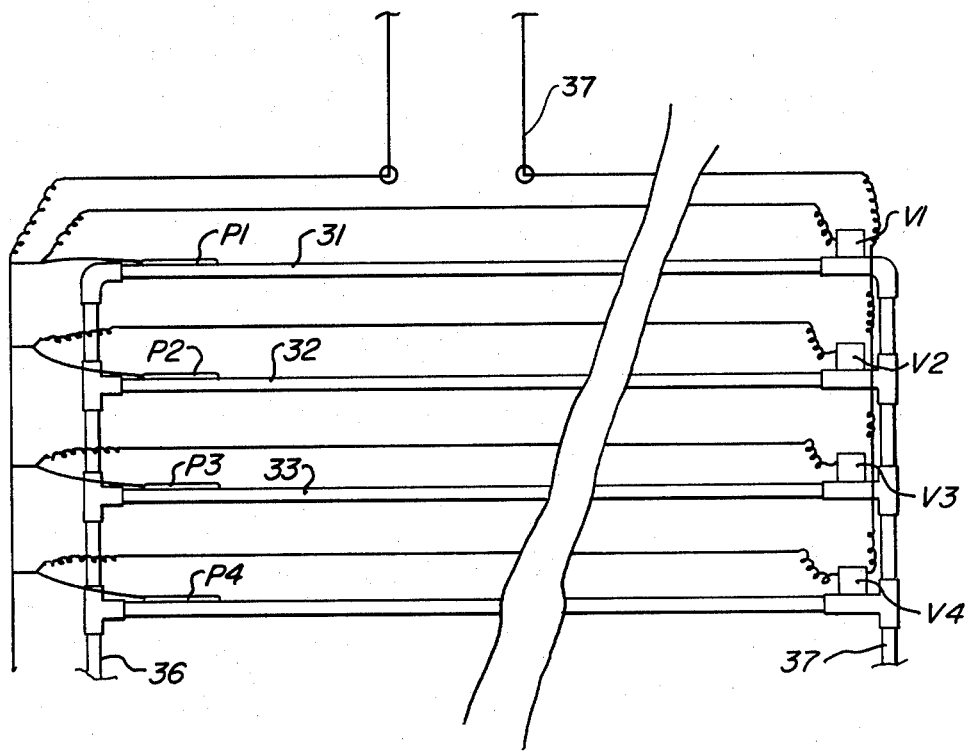
FIG. 3 is a schematic view of a solar radiation absorption unit illustrating the control circuits for operating the individual absorbers under various conditions of solar radiation.

FIG. 5-A is a modified target system similar to that shown in FIG. 5.

FIG. 6 is a schematic side elevational view of a further modified form of solar radiation reflection unit incorporating a heat storage with each absorber target, and FIG. 7 is a detail partial perspective view of the storage absorber unit of FIG. 6 illustrating the relationship of the storage units to each parabolic trough type reflector unit.

In the device shown in FIG. 1, a building 10 having a hip roof 12, is provided with a solar radiation collector, as shown in general by numeral 14, mounted on the roof in position to be impinged upon by solar radiation. The solar collector is mounted on a brace, frame members 20 and 21, in position to pick solar radiation at all times of the year, and provide reflected radiation in generally upright rays.

In one form of the invention, shown in FIG. 2, includes a bottom frame 25, normally including insulation and a lower end frame 26, also including insulation 29. The frame sections form an open top box, and the open top is closed by glazing 27 (which may be single or double panes of glass or plastic). A parabolic trough reflector 28 is mounted in one end of the frame and it is sealed on the insulation of member 26. The insulation 26 provides a support for the trough 28, and, also, provides insulation for preventing radiation of heat picked up by solar radiation. The target for solar radiation reflected from the trough parabolic reflector 28 includes an insulated framework 30. This framework is mounted generally horizontally and it includes three liquid carrying tubes 31, 32, and 33, which may have fins. The lower surface of the support 30 is preferably painted a flat black, and the liquid tubes to which is attached heat conducting members 31a, 32a, 33a, and 34a, are preferably copper, painted a flat black.

A series of parabolic troughs are mounted in the frame and extend from one end to the other. Depending upon the size of the unit, two or more of the parabolic trough reflectors may be mounted in the framework. The drawings illustrate a series of three reflectors. As shown in FIGS. 1-5 of the parabolic trough reflectors with corresponding targets are mounted in framework 14. As shown in FIG. 2, the next adjacent reflector 28a is mounted above the reflector 28, and its outer end extends over the absorber system 30. The tubes are secured in heat transfer relationship to absorbing backing members. Tube 31 is mounted on blackened backing member 31a, which is normally metal welded or soldered to the tube. In this manner, tubes 32, 33 and 34 are secured to backing member 32a, and 34a. These backing members also absorb heat. A heat absorber system is mounted in general horizontal and partially angled downwardly above the parabolic trough reflector 28. Each parabolic trough reflector may be made as long as necessary, obviously being limited by the length of the roof.

Each trough reflector is made to provide the reflected rays in a line focus, and generally upright. Thus, each reflector is so designed to focus the suns rays at any season of the year upon all the targets in sequence. The sun's rays may be from about 30° above the horizon to about 75° or more above the horizon to produce a line focus. The line focus then impinges on one of circuits 31 through 34, depending on the time of year. The area of the reflector should be sufficient to produce temperatures in the transfer medium in excess of 200° F., however, when steam is desired this can be generated by using larger sized parabolic troughs.

The illustration shows only two sets of rays, however, it is understood that the entire surface of the reflector that is exposed is impinged on by the sun's rays. These rays are concentrated into a line focus. The reflector is arranged to produce the line focus at all angles to the azimuth to and during early travel of the sun from east to west.

During fall and spring seasons, solar radiation designated is reflected from the spots on the reflector 28 and the reflection impinges on plate 32a and/or the tube 32. The winter radiation indicated by the letter impinges on the reflector and the reflection impinges as a line focus upon plate 33a and/or tube 33. The curvature of the parabolic trough is arranged so that radiation striking any part of the trough reflector reflects on the same target area to produce a line reflection. This provides for the focus of all rays impinging on the reflecting surface 28 to reflect as focus line. In a similar manner, rays P striking at the reflection surface 28 at other points reflected onto plate 34a and/or tube 34 so that all the rays are focused onto the target providing a line focus at the highest angle of the sun. Since the incident rays falling on the parabolic trough are focused into a line, that focal line produces a substantially higher temperature on the heat transfer medium carrying tubes than unfocused solar radiation devices. The system provides high energy to be received at each of the target systems during the individual seasons of the year. This system is highly efficient for heating a liquid medium.

To provide maximum heat output from the unit, the lines 31, 32, 33 and 34 are controlled so that only the line receiving the incident reflected radiation is open to the flowing heat transfer media. The other three lines are closed. As shown in FIG. 3, lines 31, 32 and 33 (line 34 is not shown but operates similarly) are connected at one end to a header 36 and to another header 37 at the opposite end. Each line is controlled by a solenoid valve, where line 31 is controlled by solenoid valve $V_1$, line 32 is controlled by solenoid valve $V_2$, and line 33 is controlled by solenoid valve $V_3$. Thermostats or heat sensors in each end of the lines opposite the valve provide means for actuating the valves $V_1$, $V_2$ and $V_3$. For other lines the system is multiplied. Thus, the heat sensor $P_1$ on line 31 on the end opposite the valve $V_1$ provides means for the actuation of valve $V_1$. In a similar manner, sensor $P_2$ controls valve $V_2$ and sensor $P_3$ controls valve $V_3$ on line 33. Current for operating the solenoids and the sensors is by conductors 37. Thus, when the reflected radiation is impinged on line 31 heat sensor $P_1$ activates an electrical circuit which opens the solenoid valve $V_1$ while the solenoid valves $V_2$ and $V_3$ are closed. This permits the heat transfer medium to flow through line 37 into the line 31 and back out the header 36 providing a heated heat transfer medium. The medium is propelled by a pump, not shown. Since the reflected radiation is not on lines 32 and 33 the sensors $P_2$ and $P_3$ do not activate the solenoids to open the valves $V_2$ and $V_3$, so the lines are closed. Only the line 31 receives the flowing heat transfer medium. As the seasons change the reflected focus line moves from one line to the other, and it is that line which received the solar radiation. Through that line's sensor, the valve is actuated to permit the fluid to flow through that line for the heat pickup period.

The parabolic trough reflector of the invention provides for concentrating solar radiation to impinge upon various single positions of the target units. The target units are arranged to only operate when impinged on by the concentrated solar radiation. Depending upon the season of the year, temperatures may extend in excess of 300° F. so that the heated fluid may be used for heating or cooling, according to the need.

In a modification of the device, FIGS. 5 and 5A show a parabolic trough reflector 28' is mounted in a framework which includes the bottom 25' and an end 26'. The reflector is mounted on insulation 29' in accordance with the device of FIG. 2. The target shown in FIG. 5 has been modified to include absorption plates which are painted flat black and secured to the bottom side of the plates are the fluid medium heat transfer tubes. Thus, plate 40 has tube 31' secured to the plate in heat transfer condition so that heat absorbed by the plate 40 is transferred to the fluid medium flowing in the tube 31'. In a similar manner, plate 41 has tube 32' secured to it so that heat picked up by the plate 41 is transferred to the fluid in the tube 32'. Plate 42 is secured to the tube 33' in a similar manner. Each of the heat absorption plates includes a bent over end which aids in accepting the line focus from the parabolic reflector.

The device of FIG. 5 is arranged with a reflection target having three target sections for the warm to cooler parts of the year. The device also contains a height-of-the-summer target plate 45, which is adjacent to the targets 31', 32', and 33'. This target includes a plate 46 bent over on both ends and fluid carrying tubes or pipes 47. This target 45 is arranged to absorb heat from rays S which are the rays of the height-of-the-summer, and normally the hottest rays of the year. Since the sun is highest, these rays strike the reflective surface 28' and are reflected upon the target 45. For example, a ray S strikes point A-3 and is reflected back into the collector 45. In a similar manner, another ray strikes point A-5 and it, likewise, is impinged against the target plate 45 to heat the same. In a lower portion of the reflector, 28', a ray S strikes point A-7 and it is reflected into the target 45. When the sun is sufficiently high to reflect back onto target 45, no radiation is reflected onto the targets 31', 32', and 33'. In the early fall and late spring, rays F impinge on points A-2, A-4 and A-6 to be reflected back onto plate 40 for heating the fluid in line 31'. In the early spring and late fall, rays F-S strike points A-2, A-4 and A-6 and due to the angle on incidence they are reflected onto target plate 41 heating the contents of line 32'. In the winter when the sun is low, rays impinge on points A-1 and A-4 to be reflected onto the target plate 42 heating the fluid in line 33'. This configuration allows for providing hot fluid for an air conditioner through the target absorbers 34 or 45, usually in the months of June, July and August.

To aid in the absorption of solar radiation and to prevent re-radiation, a device such as shown in FIG. 4 may be used. In this instance, a backing including insulation covers a plate 51, to which is attached lines 31", 32" and 33" so that any solar radiation impinging on the lower side of the plate 50 will be in a heat transfer arrangement with the tubes secured thereto. By securing heat, a half of a tube of resistant glass to the plate 51, a chamber may be made around each of the heat pipes, to prevent reradiation of heat from the pipes. In this case, hemispherical members around each tube may be evacuated to provide a vacuum chamber for each of the tubes of the three circuits. The evacuated space will thus act to prevent conduction of heat away from the tube and the plate, and will thus permit substantially higher temperature development than with targets without the evacuated chamber.

By providing integral heat storage means with the circuits for the heat transfer medium, the unit may be used in off-sun times. As shown in FIGS. 6 and 7, a frame, shown in general by numeral 60, is used to support a series of parabolic trough reflectors. Each parabolic trough reflector is sectioned, thus, a reflector 61 includes a section 61a; section 62 includes section 62a; and a section 63 includes section 63a. The parabolic mirrors or reflectors are mounted on insulation and receive insulation by means of a window member, shown as a single line 65. The target means is mounted generally horizontally above each parabolic trough, though it may be placed at any angle. The targe 66 is provided above the reflector 61, target 67 is provided above the reflector 62, and a target 68 is mounted above the reflector 63. Each target includes an enclosed conditioner, in which are mounted tubes carrying heat transfer medium fluid. Thus, tubes 70 and 71 are mounted in the container 66. The tubes are finned for good heat transfer. Each of the container 66, 67 and 68 are hollow containers and are filled with a heat energy storage system, such as eutectic salts or solids, parafin, or the like. The collector includes a bottom which is coated flat black for absorption of solar radiation. Usually the containers are made of metallic substances, such as copper, or the like, with the bottom painted a black, heat absorbing paint. By proper sizing of the container, any amount of heat energy may be stored. Preferably, the substances for heat storage, contained in the containers, may be a variety of materials, but, preferably, one that is characterized by its ability to store large quantities of heat in relatively small volumes. Such materials as eutectic mixtures absorb or release relatively high amounts of heat for a change of state, and, therefore, provide one means for storage of heat in a relatively small volume. Substances such as parafin store heat through the means of heat of fusion. The containers 66, 67 and 68 are mounted in an insulated space, as by insulation 66a, surrounding three sides of container 66; insulation 67a surrounding three sides of container 67; and insulation 68a surrounding three sides of the container 68.

In off-sun periods, one section of each reflector is arranged to seal against the container spaces, and enclose and insulate the container. Thus, section 61a of the reflector 61 is provided on a pivot pin 72, and it is arranged to pivot from the position shown in the full lines to the position shown in the dashed lines. A lever arm 75 depends on the segment 61a, and downward movement of the lever arm 75 pivots the segment 61a around the pivot pin 72 to close against the container 66. To provide the simultaneous closing of all of the segments against the target container, a push-pull rod 76 is mounted and is attached to each lever arm. A cylinder solenoid 77 (or other prime mover) is arranged to move the rod 76 for opening and closing.

The heat storage or heat sink material in the container is heated by heat absorbed by the lower surface of the metal container. In the transition from one state to another, a large quantity of heat energy may be stored, or on cooling is given up. The heat level is different for different substances, and therefore, almost any heat level may be obtained, as is well known. The finned tubes in the heat sink are used to transfer heat from the heat sink material to the fluid which is circulated to the point of use.

The use of the series of small parabolic trough reflectors provides means for a low profile of unit on the roof of a building. The horizontal target area over the reflecting surfaces provide means for maintaining an open heat transfer medium circuit at the focal line providing the maximum heat collection from the reflector. Furthermore, the parabolic troughs provide means for a stationary non-tracking heat absorber, producing maximum heat from solar radiation. The use of a heat sink in the target provides a complete solar absorption and storage unit requiring only attachment to heat medium transfer lines for the utilization of heat absorbed by the storage unit.

What is claimed is:

1. A concentrating solar collector system of the reflecting type, comprising,
   (a) a series of parabolic-trough reflecting surfaces mounted one generally above the other, and mounted at an angle to collect radiation from about 30° to 70° above the horizon and reflect generally upright rays into a line focus,
   (b) target means superposed over each said reflecting surface arranged to be impinged on by said line focus,
   (c) said target means including heat storage means,
   (d) fluid conduit means extending through said storage means and in heat transfer contact therewith, and
   (e) means for insulating said heat storage means in the absence of solar radiation, said means for insulating includes a portion of each of said series of reflecting surfaces, said portion being a section of said reflecting surface, said section being movable to cover that portion of the target upon which the focused rays impinge, said reflecting surface section further includes an insulation backing attached to the rear surface of each section and a means along one edge thereof for pivotal movement of the section into a closed position over said target means.

2. A concentrating solar radiation collector system according to claim 1, wherein said heat storage means includes a eutectic salt or a substance having a high heat of fusion.

* * * * *